United States Patent [19]

Rabon et al.

[11] Patent Number: 4,695,737
[45] Date of Patent: Sep. 22, 1987

[54] MICROCOMPUTER CONTROLLED POWER REGULATOR SYSTEM AND METHOD

[75] Inventors: Joe D. Rabon, Hacienda Heights; Rudy Haro, Alta Loma, both of Calif.

[73] Assignee: Southern California Edison, Rosemead, Calif.

[21] Appl. No.: 841,317

[22] Filed: Mar. 19, 1986

[51] Int. Cl.⁴ .............................................. H02J 3/00
[52] U.S. Cl. .................................... 307/31; 323/257; 364/493
[58] Field of Search .............. 323/256, 257, 260, 264; 307/17, 31, 147; 364/493

[56] References Cited

U.S. PATENT DOCUMENTS

| | | | |
|---|---|---|---|
| 3,855,503 | 12/1974 | Ristuccia | 340/228 R |
| 4,130,874 | 12/1978 | Pai | 307/31 |
| 4,415,968 | 11/1983 | Maeda et al. | 364/492 |
| 4,419,619 | 12/1983 | Jindrick et al. | 323/257 |
| 4,484,290 | 11/1984 | Bagnall et al. | 364/483 |
| 4,630,220 | 12/1986 | Peckinpaugh | 307/31 |

FOREIGN PATENT DOCUMENTS 513685 10/1939 United Kingdom ................ 323/256

OTHER PUBLICATIONS

"Design Principles and Methods–Distribution Voltage Regulators", Line Material Ind., Milw., Wis., Nov./64, 12pp.
"Introduction to Voltage Regulation", Allis–Chalmers #21 R8106D, 15 pp. (undated).
"Centralized Voltage Control by Use of a Programmable Microprocessor", by Rudy Haro, Joe D. Rabon, and George D. Rodriguez, Mar. 20, 1985, 15 pp.

Primary Examiner—William H. Beha, Jr.
Attorney, Agent, or Firm—Sheldon & Mak

[57] ABSTRACT

A load-compensating power distribution regulator system includes a plurality of circuit regulators interfaced to a single microcomputer, the microcomputer sensing for each circuit a regulator voltage and an output current. The microcomputer compares a computer line-drop compensated actual circuit voltage with a dynamically determined desired circuit voltage using a variably offset deadband for controlling regulator action depending on whether the output current is changing favorably for bringing the actual circuit voltage toward the desired circuit voltage. The number of regulator actions in a time period is also monitored for adjusting the magnitude of the deadband to limit wear-and-tear of the regulator.

25 Claims, 9 Drawing Figures

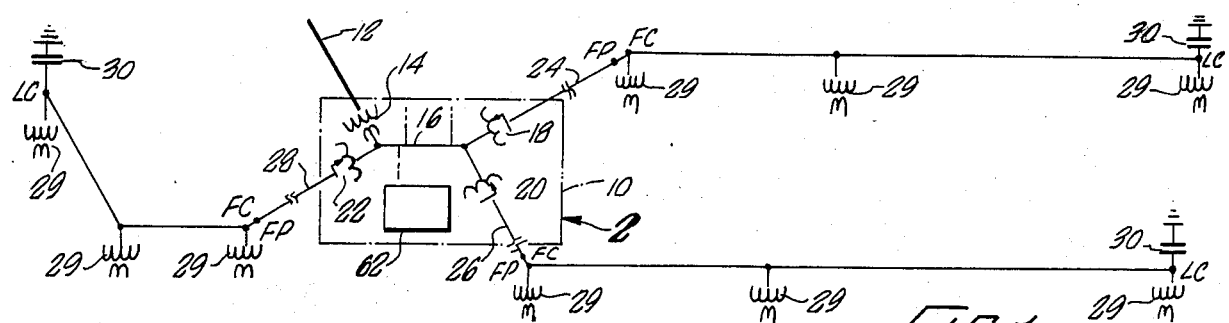
FIG. 1.
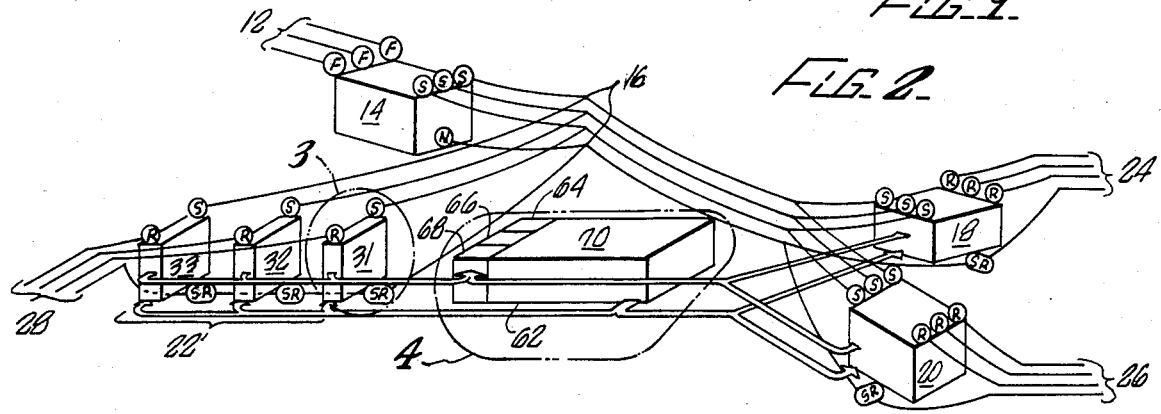
FIG. 2.
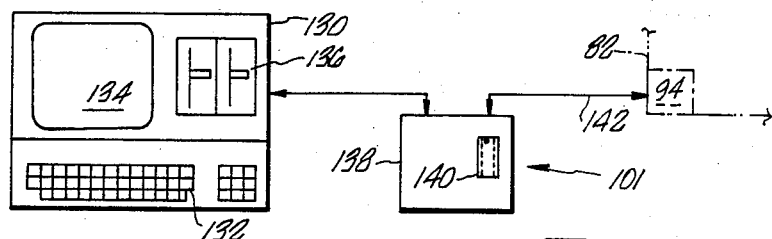
FIG. 6.
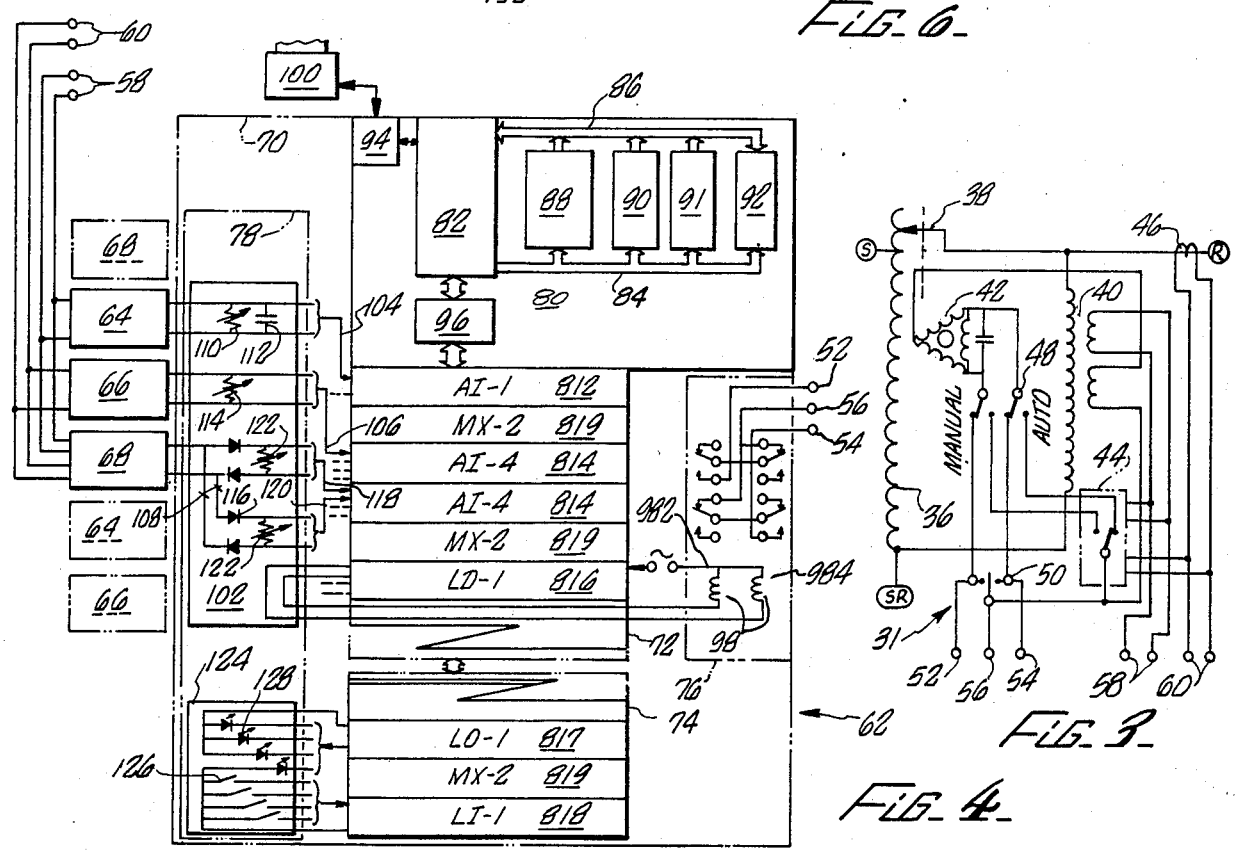
FIG. 3.
FIG. 4.

MICROCOMPUTER CONTROLLED POWER REGULATOR SYSTEM AND METHOD

BACKGROUND

The present invention relates to electrical power regulation and more particularly to centralized automatic control of regulators in a power distribution system.

In a typical power system, a distribution substation receives electrical power at a relatively high voltage such as 66kv and separately transforms the power onto individual three-phase distribution lines at a medium voltage such as 4kv. The distribution lines each extend from the substation to a plurality of consumer locations at which local transformers provide service at 120 volts or a multiple thereof. The distribution lines are each equipped with regulator transformers at the substation for controlling the distribution voltage as a function of input voltage and load current in order to maintain the service voltage at the consumer locations within a desired range. The three-phase distribution lines are typically regulated by three separate single-phase regulators, or by a single three-phase regulator.

Recent conservation measures, such as the Conservation Voltage Regulation (CVR) program have imposed tighter operating constraints on distribution circuits. With the current guidelines for CVR, the first customer must average 120 volts or less while the last customer operates at 114 volts or above.

Many existing substation regulators of the prior art allow for excessive voltage variations, making it difficult to comply with the CVR program requirements. Additionally, these controls are not sufficiently responsive to the variety of load conditions that are experienced throughout the year. Thus more sophisticated regulation is required for providing better voltage control on the distribution circuit. However, the cost of replacing the regulators with ones having greater sophistication is prohibitive.

Thus there is a need for improved voltage control of power distribution lines that complies with the CVR program, that is responsive to both short and long-term loading conditions, is easy to operate, inexpensive to produce, and can be used with the existing regulators.

SUMMARY

The present invention is directed to a load compensating regulator system for an A.C. power distribution circuit that meets this need. The system includes regulator means connected to a source voltage for varying a regulator voltage on the circuit, means for controlling the regulator in response to a control signal, means for sensing the regulator voltage, means for sensing an output current of the regulator, a digital computer, means for repetitively storing in the computer voltage and current data corresponding to samples of the voltage and current sensing means, means in the computer for determining an actual circuit voltage and a change in the output current from the voltage and current data, means for detecting whether the actual circuit voltage is within a variably offset deadband about a desired circuit voltage, the offset depending on the change in output current, and means for generating the control signal in response to the detecting means.

The system advantageously provides improved regulation as compared with existing distribution systems, and avoids unnecessary wear-and-tear of the regulator means by preventing regulator voltage changes when the change in output current is in a direction tending to shift the actual circuit voltage toward the desired circuit voltage.

Preferably the system includes means for adjusting the magnitude of the deadband periodically in response to a total number of regulator voltage changes in the period for optimizing regulation accuracy in view of the number of voltage changes resulting from actual deadband adjustments.

Preferably the system is capable of controlling a plurality of regulator channels from a single microcomputer. Thus the present invention provides a low-cost means for controlling the regulators in a typical distribution system. Preferably the system of the present invention is capable of controlling up to ten of the regulators.

The present invention also provides a method for converting an A.C. power distribution substation for centralized control of a plurality of distribution circuits, each circuit having regulator means and associated control means for connecting a common voltage to first and second sides of drive means for selectively raising and lowering a regulator voltage of the circuit, the method including the steps of:

(a) connecting a raise lead, a lower lead, and a common lead respectively to the first and second sides of the drive means, and the common voltage;

(b) providing means for sensing the regulator voltage;

(c) providing means for sensing an output current of the regulator means;

(d) interfacing the voltage and current sensing means to a digital computer for repetitively producing in the computer digital voltage and current data corresponding to the sensed regulator voltage and output current;

(e) programming the computer for determining, based on the voltage and current data, an actual circuit voltage and a change in the output current;

(f) detecting in the computer whether the actual circuit voltage is within a deadband about a desired circuit voltage, the deadband being variably offset with respect to the desired circuit voltage in response to the change in the output current for selectively producing a raise command and a lower command; and (g) selectively connecting the raise lead and the lower lead to the common lead in response to the raise command and the lower command for regulating the actual circuit voltage at approximately the desired circuit voltage.

DRAWINGS

These and other features, aspects, and advantages of the present invention will become better understood with reference to the following description, appended claims, and accompanying drawings where:

FIG. 1 is a plan pictorial schematic diagram of a microcomputer regulated electrical power distribution system according to the present invention;

FIG. 2 is a pictorial schematic diagram of a portion of the system of FIG. 1 within region 2 of FIG. 1;

FIG. 3 is a schematic diagram of a portion of the schematic of FIG. 2 within region 3 in FIG. 2;

FIG. 4 is a block diagram of a portion of the schematic of FIG. 2 within region 4 in FIG. 2;

FIG. 6 is a pictorial block diagram of programming means for the system of FIG. 1;

DESCRIPTION

Figure 5:
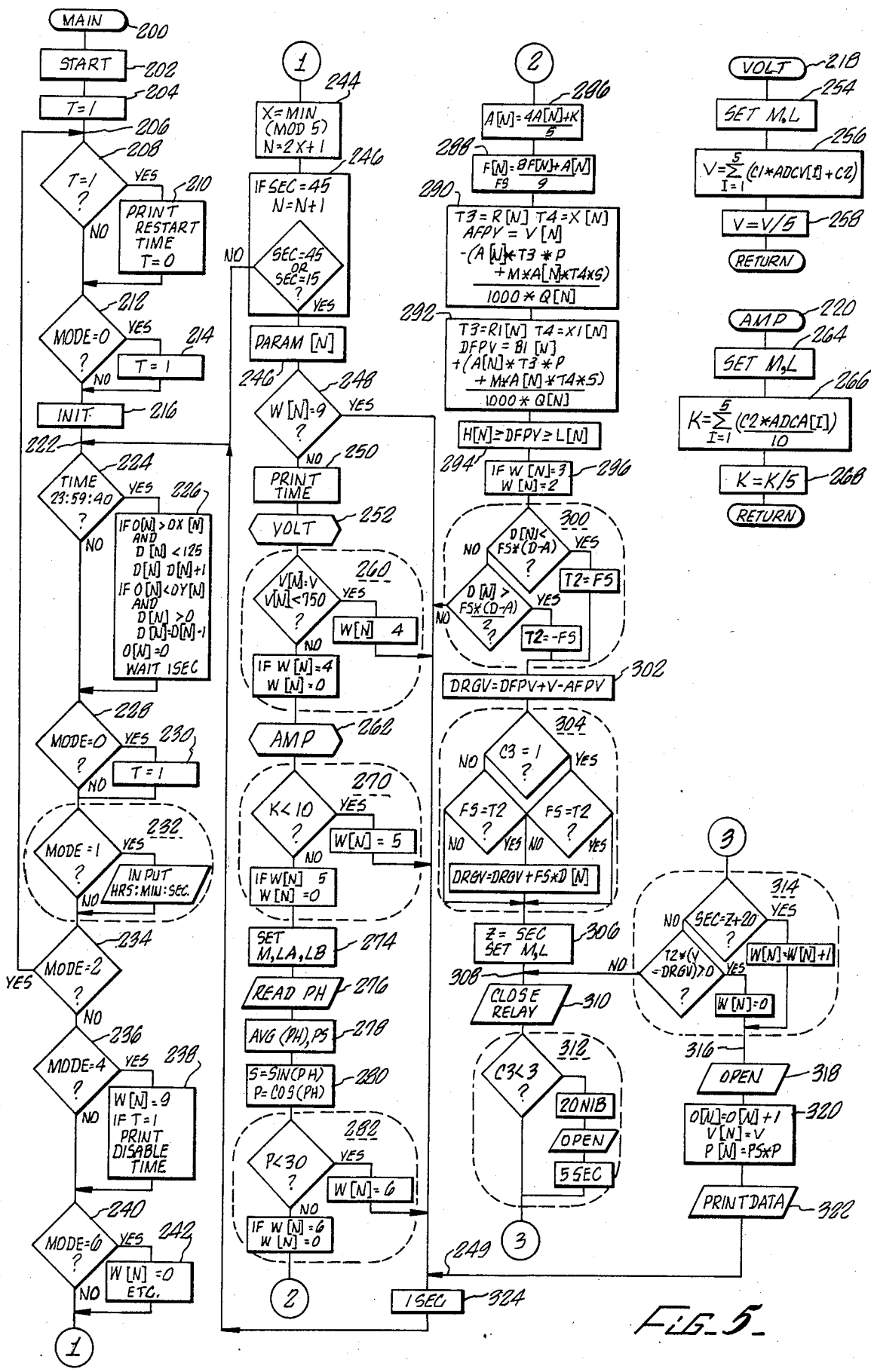
FIG. 5 is a flow diagram of a computer program of the system of FIG. 1.

The present invention is directed to a microcomputer system for simultaneous automatic line drop-compensated distribution regulation control. With reference to FIGS. 1 and 2, a power distribution substation 10 is connected to a feed line 12 for receiving power from an external source (not shown). The feed line 12 drives at least one step-down transformer 14 for producing a nominal distribution voltage on a corresponding bus 16. Typically, the feed line 12 and the bus 16 each incorporate a plurality of separate conductors in a polyphase configuration. In the following description, the bus 16 is a three-phase four-wire-wye circuit having a nominal line-to-line voltage of 4160 volts at 60 Hz. The substation 10 includes a plurality of regulator transformers, shown schematically in FIG. 1 as regulator unit 18, regulator unit 20, and regulator unit 22 for driving corresponding distribution lines, designated circuit 24, circuit 26, and circuit 28.

Each of the circuits 24-28 feeds a series of service transformers 29, and other service transformers (not shown), for stepping down the nominal 4160 volt circuit voltage to suitable levels for customer use. A first customer, designated FC, is associated with closest of the service transformers 29 to the substation 10 on each of the circuits 24-28. Similarly, a last customer, designated LC, is associated with the farthest of the service transformers 29. A capacitor bank 30 is connected to each of the circuits 24-28 proximate its LC for power factor compensation using methods known in the art. A feedpoint, designated FP and described below, is located proximate FC.

The service transformers 29 can be single phase or three-phase as required. For example, a single phase transformer having a step-down ratio of 20:1, its primary being connected between one line and neutral of a 4160 volt 3-phase circuit, produces 120 volts at its secondary, there being 2400 volts across the primary. For convenience, the voltages on the circuit 24-28 are herein described in terms of a 120 volt "base" voltage unless otherwise stated. Thus a base voltage of 112 volts implies a line-to-line voltage of 2(20)(112)Cos 30° = 3880 volts on a nominal 4160 volt three-phase circuit.

For the purpose of illustrating a variety of regulator unit configurations useful with the present invention, the regulator unit 18 is a three-phase triplex induction regulator, the regulator unit 20 is a three-phase step regulator, and the regulator unit 22 is three separate single-phase step regulators, designated regulator 31, regulator 32, and regulator 33 in FIG. 2. Each of the regulator units 18-22 is capable of adjusting the voltage of its associated distribution line above or below the voltage of the bus 16 in response to external signals for controlling voltages at locations remote from the substation 10 as described herein.

The operation of the regulator units 18 and 20, and the regulators 31-33 can be understood with reference to FIG. 3, schematically depicting the regulator 31. The regulator 31 includes a tapped autoformer winding 36 having an S terminal for connecting to a source voltage of the bus 16 and an SR terminal for connecting to a neutral voltage of the bus 16. A wiper 38 is moveably connected to the autoformer winding 36, the wiper 38 having an R terminal for providing a regulated output voltage. A potential transformer or PT 40 is connected between the R terminal and the SR terminal for sensing the regulated output voltage, the PT 40 having an appropriate turns ratio for providing a nominal reference or "base" of 120 volts. The PT 40 powers a reversible control motor 42, the motor 42 being connected for moving the wiper 38.

The regulator 31 may include a conventional control circuit 44 (not required in the present invention, but shown for ease of understanding the use of existing regulators in the present invention). The control circuit 44 conventionally receives a voltage sensing signal from the PT 40 and a current sensing signal from a current transformer or CT 46, and controls the motor 42 for maintaining a desired voltage at the R terminal. A mode switch 48 permits manual operation of the motor 42, the mode switch 48 having an "Auto" position for connecting the motor 42 to the control circuit, and a "Manual" position for connecting the motor 42 to a manual switch 50.

When the regulator 31 is used in the present invention, the mode switch 48 is normally in the "Manual" position and remote control is provided to opposite sides of the manual switch 50 through a raise lead 52 and a lower lead 54, power for the remote control being provided on a common lead 56. Thus when the common lead 56 is remotely connected to the raise lead 52, the wiper 38 moves in a direction raising the voltage at the R terminal; when the common lead 56 is instead connected to the lower lead 54, the wiper 38 moves in a direction lowering the voltage at the R terminal, the voltage being raised or lowered in small steps. Remote sensing of the voltage and current signals is provided by connecting external pairs of PT leads 58 and CT leads 60 to the respective PT 40 and CT 46.

The operation of the regulator unit 20 is similar to that of the regulator 31, except that the regulator unit 20 incorporates three of the autoformer windings 36, wye-connected, and three of the wipers 38, operating in unison.

The operation of the regulator unit 18 is similar to that of the regulator unit 20, except that continuous, stepless voltage changes are obtained by means of variable inductive coupling. Further, the regulator unit 18 has a quick response time of less than one second, in contrast to delays of approximately seven seconds between steps in the regulator unit 20 and the regulators 31-33. Thus the regulator unit 22 requires three channels of control, one for each of the regulators 31-33, while the regulator units 18 and 20 require one channel of control each, a total of five channels.

An important feature of the present invention is a control system 62 that provides inexpensive centralized voltage control for the regulator units 18 and 20, and the regulators 31-33. With reference to FIG. 4, the control system 62 includes a voltage transducer 64, a current transducer 66, and a power factor transducer 68 for each control channel of the regulator units 18–22, and a control unit 70 for receiving signals from the transducers 64–68 and driving the raise leads 52 and lower leads 54 of the corresponding control channel for providing line-drop compensated voltage regulation of the circuits 24–28. In each control channel, the voltage transducer 64 is connected to the PT leads 58, the current transducer 66 is connected to the CT leads 60, and the power factor transducer 68 is connected both to the PT leads 58 and the CT leads 60. The voltage transducers 64, current transducers 66, and power factor transducers 68 are conventional devices available from Transdata, Inc., Dublin, Ohio.

In a preferred embodiment, the control unit 70 is modular and capable of providing up to ten separate channels of control. Thus the regulator units 18 and 20, and the regulators 31–33, each requiring a channel and together requiring five channels, leave an expansion capacity of five additional channels within the control unit 70 as described herein. The control unit 70 includes a computer base 72, an auxiliary base 74, a relay block 76, and a card rack 78. The computer base 72 includes a microcomputer 80 and associated interface modules 81 described herein. The auxiliary base 74 is an extension of the computer base 72 for additional interface modules 81 beyond the capacity of the computer base 72.

The microcomputer 80 incorporates a microprocessor 82 having associated a 16-bit address bus 84 and an 8-bit data bus 86 for communicating with a system memory 88, a pair of 4 K EPROM user memories 90 and 91, and a data memory 92 within the microcomputer 80. The microcomputer 80 also includes a communication buffer 94 for communicating with local external devices, and a control buffer 96 for communicating with the interface modules 81 on the computer base 72 and the auxiliary base 74. During normal operation, the communication buffer 94 drives a printer 100 for recording operation of the control system 62. During program development, set-up and calibration, a programming device 101, described below, replaces the printer 100.

The interface modules 81 include a dual ADC module 812 for reading regulator voltages, a quad ADC module 814 for reading regulator currents and power factors, a quad load module 816 for control output, a test out module 817 and a test in module 818 for testing and calibration, and a multiplexer module 819. One of the multiplexer modules 819 is used with every two of the other interface modules 81 for decoding signals being sent and received by the control buffer 96. The computer base 72 and auxiliary base 74, the microcomputer 80, and the interface modules 81 are conventional devices available from Siemans-Allis Automation, Inc., Waltham, Mass.

The system memory 88 of the microcomputer 80 is furnished with SYBIL Basic, a control-oriented variation of the Basic programming language. (SYBIL is a trademark of Sylvania Corp.) SYBIL Basic, an interpretive high level language, includes real-time clock instructions and specific commands for addressing the interface modules 81. The real-time clock maintains HRS, MIN, SEC in a conventional 24-hour format, and NIB, where NIB is a "nibble" that increments every 20 ms, modulo-50.

As shown in FIG. 4, the relay block 76 includes a plurality of DPDT relays 98, a pair of the relays 98 being provided for each channel of control and designated raise relay 982 for activating the associated raise lead 52, and lower relay 984 for activating the associated lower lead 54. The relays 982 and 984 are driven by corresponding outputs of an associated load module 816 of the microcomputer 80, each load module 816 driving up to four of the relays 98. The raise lead 52 is wired to the common lead 56 through a normally open contact of the raise relay 982 and a normally closed contact of the lower relay 984. Similarly, the lower lead 54 is wired to the common lead 56 through a normally open contact of the lower relay 984 and a normally closed contact of the raise relay 982. Thus the relays 982 and 984 are wired such that simultaneous activation of the raise lead 52 and the lower lead 54 is not possible. Accordingly, remote control of the regulator 31 (and each other channel of regulation) is effected by appropriate SYBIL Basic commands executed by the microcomputer 80, except that in the event the load module 816 attempts to operate a pair of the relays 98 or if one of the relays is removed, that channel of control is automatically disabled.

The card rack 78 includes a signal card 102 for each channel of control, the signal card processing analog signals including a voltage signal 104 from the voltage transducer 64, a current signal 106 from the current transducer 66 and a reactive phase angle signal 108 from the power factor transducer 68. The voltage signal 104 is adjustably loaded by a voltage trimmer 110 and smoothed by a filter capacitor 112, then passed to one of the dual ADC modules 812 of the microcomputer 80 for conversion to a 12-bit digital value as further described below. Similarly, the current signal 106 is adjustably loaded by a current trimmer 114 and passed to one of the quad ADC modules 814 for conversion to a 7-bit digital value. The voltage signal 104 and the current signal 106 are unipolar; however, the phase angle signal 108 is bipolar. Accordingly, since the ADC modules 814 require unipolar inputs, the phase angle signal 108 is rectified by an array of diodes 116 for producing a positive phase signal 118 and a negative phase signal 120, each being adjustably loaded by a corresponding power factor trimmer 122 and passed to separate channels of a quad ADC module 814, each being converted to a separate 7-bit digital value. Consequently, the positive phase signal 118 and the negative phase signal 120, each being unipolar, are together representative of the bipolar phase angle signal 108. Thus the signal cards 102 permit independent analog calibration of each of the voltage transducers 64, the current transducer 66, and the power factor transducers 68. Each signal card 102 additionally provides circuit paths from the associated load module 816 and the relays 98 for disabling the corresponding channel of control in case the signal card 102 is unplugged from the card rack 98.

The card rack 78 also includes a test card 124 having a plurality of switch contacts 126 for selectively modifying operation of the microcomputer 80. The contacts 126 are wired to the test in card 818 for forming a binary MODE value. The test card 130 also includes a plurality of LED's 128 operated by the test out card 817 for indicating status conditions of the microcomputer 80.

With reference to FIG. 6, the programming unit 101 includes a portable computer 130 having a keyboard 132, a CRT display 134, and disk storage means 136. The portable computer 130 is connected to an interface unit 138 having a socket 140 for receiving a 4K EPROM chip, the interface unit 138 having an interface cable 142 for connecting to the communication buffer 94 of the microprocessor 82. Programs for the microcomputer 80 are entered by the keyboard 132, saved on the disk storage means 136, and "burned into" 4K EPROM chips at the socket 140, a pair of the chips being programmed as the user memories 90 and 91 of the microprocessor 80. The programming unit 101 is also capable of monitoring and modifying operation of the control unit 70. The programming unit 101 is available from Siemans-Allis, above, for use with the microcomputer 80.

With reference to FIG. 5, the user memory 90 of the microprocessor 82 is programmed for performing predetermined steps in the SYBIL Basic language described above. Beginning at MAIN 200, START 202 initializes the data memory 92 and the printer 100, then SET 204 sets a flag T, T being used for selectively controlling whether programmed printer operations actually happen. Next, at a restart point 206, TEST 208 tests whether the T flag is set, in which case RTIME 210 sends "Restart" and the current value of the real-time clock (hours, minutes, and seconds) to be printed on the printer 100, also resetting T. Otherwise, and following RTIME 210, TEST 212 tests whether the MODE value from the test in card 818 is zero, in which case SET 214 sets T. Otherwise, and following SET 214, INIT 216 sets an initial voltage offset, voltage and current conversion factors and, for each control channel N, calls subroutines VOLT 218 and AMP 220 for reading voltage V and current A[N] as described below, sets v[N]=V, F[N]=A[N], W[N]=$\phi$, and D[N]. Y[N] is an average regulator voltage, A[N] is an average regulator current, F[N] is a filtered current, W[N] is a wait value, and D[N] is a deadband value.

It should be understood that although array notation is used herein for convenience, the SYBIL Basic implementation of the system memory 88 of an experimental version of the present invention does not include subscripted variables or array instructions. Consequently, the program as actually implemented includes discrete instructions where the array operations are indicated, using conventional programming methods. It is intended, however, that the present invention be practiced with any high-level, control oriented programming language. Thus array operations are in view if they are supported by the language.

An important feature of the present invention is that at a loop point 222 following INIT 216, DAY 224 tests whether the end of 24-hour period of time has been reached. If so, BAND 226 tests 0[N] or each channel, D[N] being adjusted accordingly for optimizing operation of the control system 62 to maintain adequate control performance while limiting undesirable wear-and-tear of the regulator units. O[N] is accumulated during each 24-hour period as described below, representing for each channel the total number of regulator "tap change" operations or actions in the period. Separate values OX[N] and OY[N] are programmed for each channel, respectively representing desired upper and lower numbers of tap changes per day for the particular regulator units 18–22 of the substation 10. The range of D[N] is limited between zero and 125, representing 12.5 volts. Thus BAND 226 first tests whether 0[N] exceeds OX[N] while being less than 125, in which case D[N] is incremented at least once for reducing the number of tap changes. Similarly, if 0[N] is less than OY[N] while being greater than zero, D[N] is decremented for improved voltage regulation on that channel. At the conclusion of BAND 226, the program is suspended for one second for insuring that BAND 226 is not inadvertently executed on successive entries of DAY 224.

Alternatively BAND 226 can be programmed to operate at intervals other than 24 hours. For example, D[N] can be reduced during critical time periods according to a relatively higher number of tap change operations allowable in the critical periods; D[N] being increased during non-critical periods. OX[N] and OY[N] are then programmed separately for separate periods in the day, or the lengths of the periods set non-uniformly for representing different numbers of tap changes per unit of time.

After DAY 224 (or BAND 226), TEST 228 and SET 230 sets T if MODE is zero as described above in TEST 112 and SET 114. TIME 232 next tests MODE for a value of one, in which case the real-time-clock of the microcomputer 80 is reset from data provided to the communication buffer 94. After TIME 232, RESTART 234 tests MODE for a value of two, in which case program control is transferred to the restart point 206 for restarting the program.

MODE is next tested for a value of four in TEST 236. If so, DISABLE 238 sets W[N]=9 for disabling each channel as described below; then if T is set, "Disabled" and the current value of the real-time-clock is sent to be printed on the printer 100. TEST 240 next tests MODE for a value of six, in which case ENABLE 242 sets W[N]=$\phi$ for enabling each channel as described below; then, if T is set, "Enabled" and the current value of the real-time-clock is sent to be printed on the printer 100.

Following TEST 240 (or ENABLE 242), CYCLE 244 stores X as a modulo-five integer representation of MIN from the real-time-clock, and computes N=2 X+1. Next, HMIN 246 tests whether SEC=45, in which case N is incremented. Also, if SEC is either 15 or 45, a control sequence is initiated for the current channel N as described herein, otherwise control is transferred to the loop point 222. Thus ten channels are controlled at 30-second intervals once in each five minute period of time, N incrementing from 1 to 10.

In the control sequence, PARAM 246 obtains programmed parameter values for the current channel N as follow:

(a) Physical Parameters:
Q=PT step-down ratio to 120 volt base;
R=resistance to FP; (ohms*100)
X=reactance to FP;
R1=resistance from FP to LC; and
X1=reactance from FP to LC;

(b) Engineering Unit Conversion Factors;
C1=voltage conversion;
C2=current conversion; and
C4=voltage offset;

(c) voltage Parameters in tenths of volts;
B1=offset (desired voltage at LC);
H=upper limit; and
L=lower limit; and (d) C3=regulator type (step or induction).

Next, DISABLED 248 tests whether W[N] is nine, in which case control is transferred to a bypass point 249 for bypassing control of the current channel; otherwise, TPRINT 250 sends the current value of the real-time-clock to the printer 100. Following TPRINT 250, CALLV 252 calls the VOLT 218 subroutine for measuring the regulator voltage.

VOLT 218 determines in ADDR 254 an M value for addressing the dual ADC module 812 corresponding to the current channel N, and an L value for selecting the respective half of the module 812 for measuring regulator voltage of the channel. Next, VLOOP 256 accumulates for I=1 to 5, $$V = \Sigma(C1*ADCV[I] + C2)$$

where ADCV[I] represents successive digital regulator voltage measurements by the ADC module 812 for the current channel. Next, YAVG 258 computes Y=V/5, the average of the five measurements in tenths of volts. Program control is next returned to the calling program.

After CALLV 252, VLOW 260 sets v[N]=V and tests whether v[N] is less than 750 (75 volts, an unreasonable voltage), in which case W[N] is set to four for indicating the unreasonable voltage as described below, and program control is passed to the bypass point 249; otherwise if W[N] is four (from a previous unreasonable voltage condition), W[N] is reset to zero for resuming control of the current channel. CALLA 262 then calls the AMP 220 subroutine.

AMP 220 determines in ADDR 264 an M value for addressing the quad ADC module 814 corresponding to the current channel N, and an L value for selecting the respective quarter of the module 814 for measuring regulator current. Next, CLOOP 266 accumulates for I=1 to 5, $$K = \Sigma(C2*ADCA[I])/10$$

where ADCA[I] represents successive digital regulator current measurements by the ADC module 814 for the current channel. Next, CAVG 268 computes K=K/5, the average of the five measurements in amperes. Program control is next returned to the calling program.

After CALLA 262, KLOW 270 tests whether K is not greater than 10 amps (an unreasonably low current), in which case W[N] is set to five for indicating that condition as described below, and program control is passed to the bypass point 249; otherwise if W[N] is five (from a previous open condition), W[N] is reset to zero for restoring control of the current channel.

After KLOW 270, ADDR 272 determires an M value for addressing the quad ADC module 814 corresponding to the current channel N, and respective LA and LB values selecting the respective quarters of the module 814 for measuring the positive and negative reactive phase angles of the channel. Next, PLOOP 276 accumulates for I=1 to 5, $$PH = \Sigma(ADCP[I] - ADCM[I])$$

where ADCP[I] represents successive digital positive phase component measurements by the ADC module 814 for the current channel, and ADCM[I] represents corresponding negative components. Next, PAvG 278 sets PS to +1 or −1 according to the sign of PH, then computes PH=ABS(PH)/5, the average of the five measurement pairs, scaled such that a value of 128 represents 90°.

After PAVG 278, PTRIG 280 produces S=SIN(PH) and P=COS(PH), S and P being scaled from 1 to 100. PTRIG 280 operates by successively comparing PH with increasingly larger values, S and P being set according to a value equalled or exceeded by PH. The comparison values are advantageously non-uniformly spaced corresponding to the resolution of P and S, concentrated toward P=100 for conserving program time and memory requirements.

PLOW 282 next tests whether P is less than 30 (an unreasonable power factor) in which case W[N] is set to six for indicating the unreasonable power factor as described below, and program control is passed to the bypass point 249; otherwise if W[N] is six (from a revious unreasonable power factor condition), W[N] is reset to zero for resuming control of the current channel.

Having determined reasonable values of Y[N], K and PF, the program in KAVG 286 computes for the current channel N a moving average A[N] of the measured regulator current nominally over five five-minute sample periods, $$A[N] = (4*A[N] + K)/5$$

Then FILTER 288 computes a filtered moving average or trend F[N] of the moving average A[N] over nine of the sample periods, $$F[N] = (8*F[N] + A[N])/9$$

additionally comparing F[N] with A[N] and setting FS to +1 or −1 depending on whether F[N] is increasing or decreasing. FILTER 288 thus advantageously determines a current change with respect to a load trend of the channel.

ACTUAL 290 next computes an "actual feedpoint voltage" for the current channel FP, $$AFPV = V[N] - (A[N]*R[N]*P + M*A[N]*X[N]*S)/Q[N]*1000$$

For example, if V[N]=1270, A[N]=200, R[N]=55, [N]=77, Q[N]=20 P=90 and M=1, $$AFPV = 1270 - (200*55*90 + 1*200*77*44)/20*1000$$

$$= 1270 - 83 = 1187$$

Floating point calculations are used in ACTUAL 290 for accuracy, AFPV being restored to an integer value after the calculations. Also, temporary parameters T3=R[N] and T4=X[N] are used in the calculations, the function $$(A[N]*T3*P + M*A[N]*T4*S)/Q[N]*1000$$

being programmed as a subroutine for further use as described herein.

DESIRE 292 next computes a "desired feedpoint voltage" for the current channel FP, $$DFPV = B1[N] + (A[N]*R1[N]*P + M*A[N]*X1[N]*S)/Q[N]*1000$$

using floating point calculations and the temporary parameters T3=R1[N] and T4=X1[N] in the function $$(A[N]*T3*P + M*A[N]*T4*S)/Q[N]*1000$$

as described in ACTUAL 290. In the above example, if R1=36, X1=24, and B1=1160, $$DFPV = 1160 + 43 = 1203$$

CLIP 294 tests whether DFPV exceeds H[N], in which case DFPV is set to H[N], and whether DFPV is lower than L[N], in which case DFPV is set to L[N]. Thus DFPV is clipped between H[N] and L[N] for insuring that abnormal loading conditions do not cause unwanted regulator settings.

An important feature of the present invention is that the desired feedpoint voltage DFPV is dynamically determined in response to circuit loading. This is in contrast to conventional regulation to a fixed feedpoint voltage. Thus the present invention provides regulation to an automatically variable feedpoint voltage as further described below.

After CLIP 294, LIMIT 296 tests whether W[N] is three, in which case W[N] is set to two. Thus when W[N] is incremented as described below, it does not increment beyond three. Accordingly, W[N] is maintained between 0 and 3 unless the current channel is disabled as described above.

Following LIMIT 296, ACTION 300 determines whether a raise or lower action is to be performed on the current channel. If D[N] is less than FS*(DFPV−AFPV), then T2 is set to FS; otherwise if D[N] is more than half as large as FS*(DFPV−AFPV), then T2 is set to −FS; but if neither condition is true, control is passed to the bypass point 249.

Figure 7:
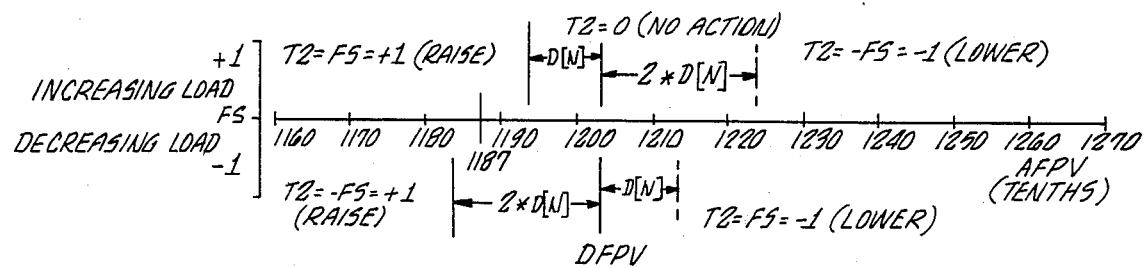
FIG. 7 is graph showing operation of the system of FIG. 1.

The operation of ACTION 30 can be better understood with reference to FIG. 7, wherein "Raise" and "Lower" actions are shown with corresponding values of T2 as a function of FS in a comparison of AFPV with the deadband D[N] about DFPV. For example, when FA=+1 (increasing load), if APFV is lower than D[N] below DFPV, T2 is set to +1 for producing a raise action. Also, if APFY is higher than twice D[N] above DFPY, T2 is set to −1 for producing a lower action. When AFPV is within these limits, no action is initiated. Further, when FS=1 (decreasing load), if FPFV is lower than 2*D[N] below DFPV, T2 is set to +1 for producing a raise action. Thus improved regulation is accomplished and unnecessary step changes are avoided by offsetting the deadband depending on whether the load is increasing or decreasing. (D[N] is thus one-third of a total deadband.) In the above examples, if D[N]=10 and FS=+1, AFPV, at 1187, is less than DFPV - D[N], 1193, so that T2 is set to +1, calling for a raise action. If the load was instead decreasing (FS=−1), no action would be taken because AFPV is greater than DFPV−2*D[N], 1183.

After ACTION 300, REFLECT 302 calls VOLT 218 and computes a "desired regulator voltage" DRGV based on DFPV for referencing regulator responses as follows:

DRGV=DFPV+V−AFPV

In the above example, if V is 1272,

DRGV=1203+1272−1187=1288.

An important feature of the present invention is that DRGV is conditionally adjusted in DMOD 304 by D[N] depending on whether the load is changing in a direction tending to bring AFPV within the deadband, and also depending on whether the current channel has a step (C3=3) or induction (C3=1) regulator. If C3 is 1 and T2 is opposite FS, or if C3 is 3 and T2 equals FS, then

DRGV=DRGV+FS*D[N]

Otherwise, DRGV is unchanged. Thus for a step regulator, DRGV is offset for overdriving the regulator when the load is changing adversely to the desired voltage correction for avoiding a need for future action. In the above example, DRGV=1288+1*10=1298, in the case of step regulator. Similarly for an induction regulator, DRGV is offset for underdriving the regulator when the load is changing favorably to the desired voltage correction for avoiding excessive voltage variations. Thus the present invention facilitates conversion of existing installations having a variety of regulator response characteristics to centralized automatic operation.

ADDR 306 next saves in Z the current value of the real-time-clock and determines an M value for addressing the quad load module 816 corresponding to the current channel N, and an L value for selecting the respective quarter of the module 816 for driving the raise relay 982 or the lower relay 984 of the channel, depending on T2. At a cycle point 308 in the program, CLOSE 310 then energizes the selected relay 98 for initiating a regulator action. PULSE 312 next tests C3 to determine whether the current channel has an induction regulator. If so, the program is paused for 20 nibbles (400 ms), the selected relay 98 is de-energized, and the program is again paused for five seconds; otherwise, the selected relay remains energized.

Following PULSE 312, MONITOR 314 calls VOLT 218 for verifying and terminating the regulator action following operation of the relay 98. If twenty seconds have elapsed from the time saved in Z in ADDR 306, W[N] is incremented for signifying that the maximum period of time for regulator response in the current control sequence has expired, and program control is transferred to a stop point 316. Otherwise, T2*(Y-DRGV) is evaluated and tested to determine whether there has been sufficient regulator response. If the result is positive, then W[N] is set to zero and control is passed to the stop point 316, V having changed sufficiently to produce a desired change in AFPV so that execution of ACTION 300 would not call for an action in the next control sequence for the present channel N.

In the above example, if the most recent value of V is 1288 or more, the test is satisfied; otherwise, control is returned to the cycle point 308 for continued operation of the selected relay 98. In the case of an induction regular, the relay 98 is pulsed on for 400 ms and off for five seconds until there is sufficient regulator response or twenty seconds elapses, whichever occurs first.

When a channel is first enabled, its W[N] is set to zero as described above. In MONITOR 314, W[N] is also set to zero upon successful completion of a raise or lower action. If an initiated action is not completed, W[N] is incremented. Thus W[N] signifies a number of successive control sequences during which the channel has not responded to a step change, except that W[N] is limited to three unless the channel is disabled as described above.

At the stop point 316, OPEN 318 de-energizes the selected relay 98 (except that in the case of an induction regulator it was already de-energized in PULSE 312), and COUNT 320 increments O[N] for accumulating a total number of regulator operations for periodically adjusting D[N] in DAY 224 as described above.

COUNT 320 also sets V[N]=V, the most recent voltage measurement taken in MONITOR 314, and saves P[N]=PS*P for signifying in a single value both leading and lagging power factor values.

At the close of the control sequence, NPRINT 322 sends to the printer 100 the value of the real-time-clock, identification of the current channel N, and the corresponding A[N], F[N], DFPV, AFPV, V[N], D[N], P[N], 0[N], and (DFPV-AFPV) in an operational log of the control system 62. NPRINT 322 also sends W[N], together with a corresponding diagnostic message, to the printer 100, as follows:

| W[N] | Message |
| --- | --- |
| 0 | Normal Termination |
| 1-3 | No Response |
| 4 | Disabled, Volt = V |
| 5 | Disabled, Amps = K |
| 6 | Disabled, PF = P[N] |

Finally, following NPRINT 322, control passes to the bypass point 249, where LOOP 324 pauses the program for one second, then transfers program control to the loop point 222 for starting a new control sequence on the next channel N+1.

The experimental version of the present invention was tested at the Amador Substation in Southern Calif. without a power factor transducer 68, P[N] being arbitrarily set to 100. The control system 62 was connected to actual circuits as follows:

(a) Regulator unit 18 (triplex induction) to the "El Monte" circuit 24 without a capacitor bank 30 thereon;

(b) Regulator unit 20 (triplex step) to the "Arden" circuit 26 having a 300 KVAR capacitor bank 30 thereon; and (c) Regulator unit 22 (three step regulators) to the "Brooks" circuit 28 having a 300 KVAR capacitor bank 30 thereon.

Figure 8:
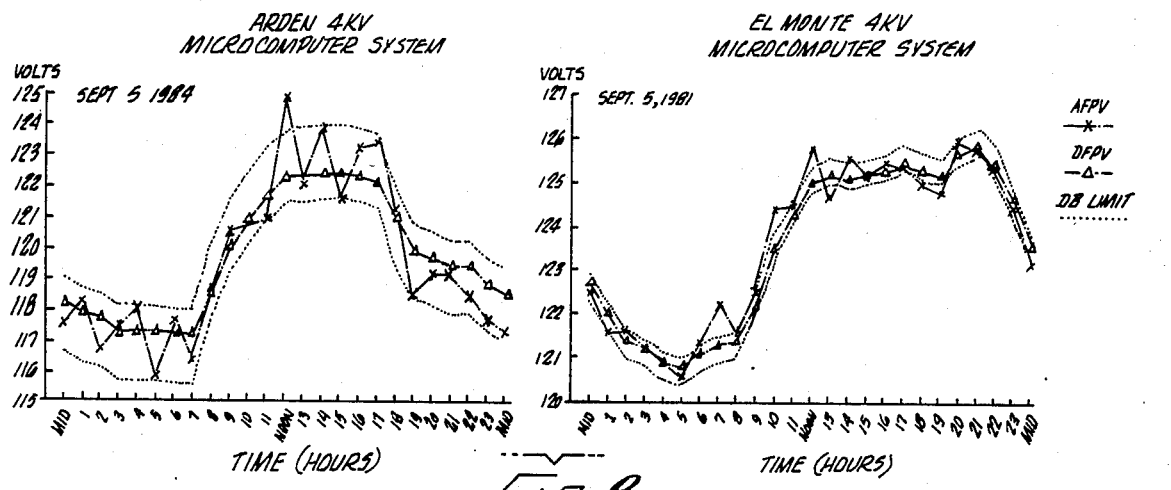
FIG. 8 is a graph showing operation of the system of FIG. 1 over a 24-hour period.
Figure 9:
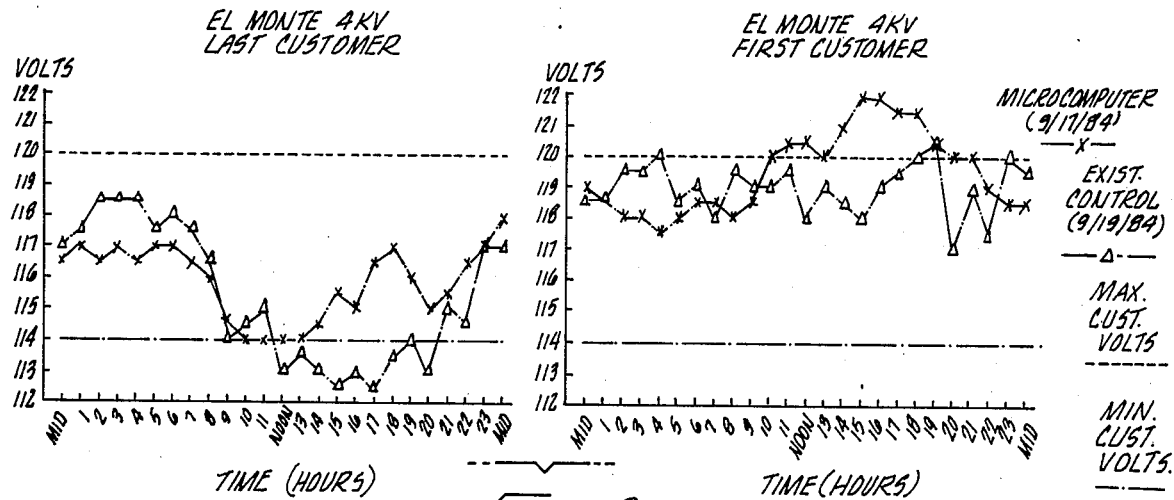
FIG. 9 is a graph showing operation of the system of FIG. 1 according to the present invention compared with conventional operation over related 24-hour periods.

FIG. 8 shows recorded values of AFPV and DFPV on the Arden and El Monte circuits during a 24-hour period. FIG. 9 shows measured circuit voltages for the last customer LC and first customer FC on the El Monte circuit with the present invention compared with the voltages provided under previously existing control. As shown in FIG. 9, the present invention provides improved regulation in terms of the CVR minimum customer voltage of 114 volts and maximum average customer voltage of 120 volts.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A method for operating an A.C. power distribution substation for centralized control of a plurality of distribution circuits, each circuit having regulator means and associated control means for connecting a common voltage to first and second sides of drive means for selectively raising and lowering a regulator voltage of the circuit, the method comprising the steps of:
   (b) sensing the regulator voltage;
   (c) sensing an output current of the regulator means;
   (d) repetitively producing digital voltage and current data corresponding to the sensed regulator voltage and output current;
   (e) determining, based on the voltage and current data, and actual circuit voltage and a change in the output current;
   (f) detecting whether the actual circuit voltage is within a deadband about a desired circuit voltage, the deadband being variably offset with respect to the desired circuit voltage in response to the change in the output current for selectively producing a raise command and a lower command; and
   (g) selectively driving the first and second sides of the drive means to the common voltage in response to the raise command and the lower command for regulating the actual circuit voltage at approximately the desired circuit voltage.

2. A method for controlling an A.C. power distribution substation for centralized control of a plurality of distribution circuits, each circuit having regulator means and associated control means for connecting a common voltage to first and second sides of drive means for selectively raising and lowering a regulator voltage of the circuit, the method comprising the steps of:
   (a) sensing the regulator voltage of the regulator means;
   (b) sensing an output current of the regulator means; feeding the sensed voltage and current to a digital computer for repetitively producing in the computer digital voltage and current data corresponding to the sensed regulator voltage and output current;
   (d) determining, based on the voltage and current data, an actual circuit voltage and a change in the output current;
   (e) detecting whether the actual circuit voltage is within a predetermined deadband about a desired circuit voltage, the deadband being variably offset with respect to the desired circuit voltage in response to the change in the output current for selectively producing a raise command and a lower command; and first
   (f) selectively connecting the first and second sides of the drive means to the common voltage in response to the raise command and the for regulating the actual circuit voltage at approximately the desired circuit voltage.

3. A load compensating power regulator system for a plurality of A.C. power distribution circuits, each circuit being connected to a source of power at a source voltage, each circuit having a feedpoint and a customer point located thereon, the regulator comprising:
   (a) regulator means connected between the source and the circuit for varying a regulator voltage of the circuit;
   (b) control means for the regulator means for changing the regulator voltage in response to a control signal;
   (c) means for sensing the regulator voltage;
   (d) means for sensing an output current of the regulator means;
   (e) means for sensing a phase relationship between the regulator voltage and the output current;
   (f) a digital computer;
   (g) interface means for repetitively producing in the computer digital voltage, current, and phase data corresponding respectively to the sensed regulator voltage, output current, and phase relationship;
   (h) means in the computer for calculating a desired feedpoint voltage at the feedpoint as a function of the digital regualtor voltage, output current, and phase data;

(i) means in the computer for referencing digital deadband data with respect to the desired feedpoint voltage; and (j) means for generating the control signal for the control means for changing the output voltage for conforming the output voltage with the desired feedpoint voltage when the output voltage corresponds to a voltage outside of the deadband.

4. The system of claim 3 further comprising means in the computer for determining, based upon the digital output current data, changes in the output current.

5. The system of claim 4 wherein the regulator means include at least a first regulator having a slow response characteristic and a second regulator having a fast response characteristic, the detecting means being programmed for selectively overdriving the first regualtor for avoiding unnecessary regulation activity when the change in the output current is in a direction tending to move the actual circuit voltage away from the desired circuit voltage, the detecting means being programmed for selectively underdriving the second regulator when the change in the output current is in a direction tending to move the actual circuit voltage toward the desired circuit voltage.

6. The system of claim 4 wherein the regulator means include at least a first regulator having a slow response characteristic and a second regulator having a fast response characteristic, the generating means being programmed for continuously generating for the first regulator the control signals for up to a predetermined period of time, the generating means being programmed for pulsing for the second regulator the control signal for up to the predetermined period of time.

7. The system of claim 3 wherein the digital computer comprises a microprocessor and at least five of the regulator means are controlled by the microprocessor.

8. The system of claim 7 in which the microprocessor is capable of controlling up to ten of the regulator means.

9. The system of claim 7 wherein the interface means, the calculating means, and the generating means cooperate in a repetitive control cycle, the control cycle operating in a high-level interpretive program language wherein successive program elements are interpreted by the microprocessor and translated into directly executable instruction codes as the cycle progresses.

10. The system of claim 9 wherein the microprocessor is allocated up to about 30 seconds of time for each of the circuits for completing a single control cycle of all of the circuits.

11. A load compensating power regulator system for at least one A.C. power distribution circuit, the circuit being connected to the source of power at a source voltage, the circuit having a feedpoint and a customer point located thereon, the system comprising:

(a) regulator means connected between the source and the circuit for varying a regulator voltage of the circuit;

(b) control means for the regulator means for changing the regulator voltage in response to a control signal;

(c) means for sensing the regulator voltage;

(d) means for sensing an output current of the regulator means;

(e) a digital computer;

(f) interface means for repetitively producing in the computer digital voltage and current data corresponding respectively to the sensed regulator voltage and output current;

(g) means in the computer for determining, based on the digital voltage and current data, an actual circuit voltage;

(h) means in the computer for determining, based upon the digital current data, a change in the output current;

(i) means in the computer for detecting whether the actual circuit voltage is within a deadband about a desired circuit voltage, the deadband being variably offset with respect to the desired circuit voltage in response to the change in the output current; and (j) means for generating the control signal for conforming the actual circuit voltage with the desired circuit voltage in response to the detecting means.

12. The system of claim 11 wherein the detecting means comprises:

(a) first comparison means for testing whether the desired circuit voltage reduced by the actual circuit voltage and multiplied by a function of the change in the output current is greater than a deadband value; and (b) second comparison means for testing whether the desired circuit voltage reduced by the actual circuit voltage and multiplied by the function of output current change is less than a factor of the deadband value, the factor being greater than unity for increasing the deadband in a direction for avoiding regulator voltage changes when the change in output current is in a direction tending to change the actual circuit voltage toward the desired voltage.

13. The system of claim 12 wherein the function of the change in the output current is a constant, the constant having a polarity corresponding to the direction of the change.

14. The system of claim 11 further comprising:

(a) means for calculating a desired feedpoint voltage at the feedpoint as a function of a desired voltage at the customer point and the digital output current data; and (b) means for calculating an actual feedpoint voltage at the feedpoint as a function of the digital regulator voltage and output current data, wherein the circuit voltage is the feedpoint voltage.

15. The system of claim further comprising means for sensing a phase relationship between the regulator voltage and the output current, wherein the interface means includes means for repetitively producing in the computer digital phase data corresponding to the sensed phase relationship, and the means for calculating the actual and desired feedpoint voltages include means for determining a power factor corresponding to the phase data.

16. The system of claim 11 further comprising:

(a) means for periodically accumulating a total number of regulator actions in response to the detecting means; and (b) means for adjusting the deadband in response to the total number of actions.

17. The system of claim 16 including means for periodically comparing the total number of actions during the period with a desired range of the number, whereby the deadband is incremented when the total number of actions is less than the desired range, and the deadband is decremented when the total number of actions is greater than the desired range, the deadband being confined between a maximum deadband and a minimum deadband.

18. The system of claim 11 in which the means for determining a change in the output current maintains a moving average of the current data, and a filtered average of the moving average, periodically comparing the moving average with the filtered average.

19. The system of claim 11 in which the generating means includes means for repeatably measuring the regulator voltage and terminating the control signal after a predetermined change in the measured regulator voltage.

20. A load compensating power regulator system for a plurality of A.C. power distribution circuits, each circuit being connected to a source of power at a source voltage, each circuit having a feedpoint and a customer point located thereon, the system comprising:
   (a) regulator means connected between the source and the circuit for varying a regulator voltage of the circuit;
   (b) control means for the regulator means for changing the regulator voltage in response to a control signal;
   (c) means for sensing the regulator voltage;
   (d) means for sensing an output current of the regulator means;
   (e) means for sensing a phase relationship between the regulator voltage and the output current;
   (f) a digital computer;
   (g) interface means for repetitively producing in the computer digital voltage, current, and phase data corresponding respectively to the sensed regulator voltage, output current, and phase relationship;
   (h) means in the computer for calculating a desired feedpoint voltage at the feedpoint as a function of the digital regulator voltage, output current, and phase data;
   (i) means in the computer for referencing digital deadband data with respect to the desired feedpoint voltage;
   (j) means in the computer for determining, based upon the digital output current data, changes in the output current;
   (k) means in the computer for offsetting the digital deadband data with respect to the desired feedpoint voltage in response to the changes in the output current; and
   (l) means for generating the control signal for the control means for changing the output voltage for conforming the output voltage with the desired feedpoint voltage when the output voltage corresponds to a voltage outside of the deadband.

21. The system of claim 20 wherein the digital computer is programmed for performing predetermined steps comprising the steps of FIG. 5.

22. The system of claim 20 wherein the regulator means include at least a first regulator having a slow response characteristic and a second regulator having a fast response characteristic, the detecting means being programmed for selectively overdriving the first regulator for avoiding unnecessary regulation activity when the change in the output current is in a direction tending to move the actual circuit voltage away from the desired circuit voltage, the detecting means being programmed for selectively underdriving the second regulator when the change in the output current is in a direction tending to move the actual circuit voltage toward the desired circuit voltage.

23. The system of claim 20 wherein the regulator means include at least a first regulator having a slow response characteristic and a second regulator having a fast response characteristic, the generating means being programmed for continuously generating for the first regulator the control signal for up to a predetermined period of time, the generating means being programmed for pulsing for the second regulator the control signal for up to the predetermined period of time.

24. The system of claim 20 wherein the digital computer comprises a microprocessor and at least five of the regulator means are controlled by the microprocessor.

25. The system of claim 24 in which the microprocessor is capable of controlling up to ten of the regulator means.

* * * * *